(No Model.)

J. MILLER.
CREAMERY ATTACHMENT FOR REFRIGERATORS.

No. 280,940. Patented July 10, 1883.

Witnesses:
E. D. Asmus
M. Kaumheimer

Inventor:
John Miller,
By Stout & Underwood
Attorneys.

UNITED STATES PATENT OFFICE.

JOHN MILLER, OF RACINE, WISCONSIN.

CREAMERY ATTACHMENT FOR REFRIGERATORS.

SPECIFICATION forming part of Letters Patent No. 280,940, dated July 10, 1883.

Application filed April 2, 1883. (No model.)

*To all whom it may concern:*

Be it known that I, JOHN MILLER, of Racine, in the county of Racine, and in the State of Wisconsin, have invented certain new and useful Improvements in Creamery Attachments for Refrigerators; and I do hereby declare that the following is a full, clear, and exact description thereof.

My invention relates to refrigerators; and it consists of an attachment thereto designed to facilitate the raising of cream or milk contained in cans or other receptacles placed in said refrigerator; and it consists of certain peculiarities of construction, as will be more fully set forth hereinafter.

Figure 1:
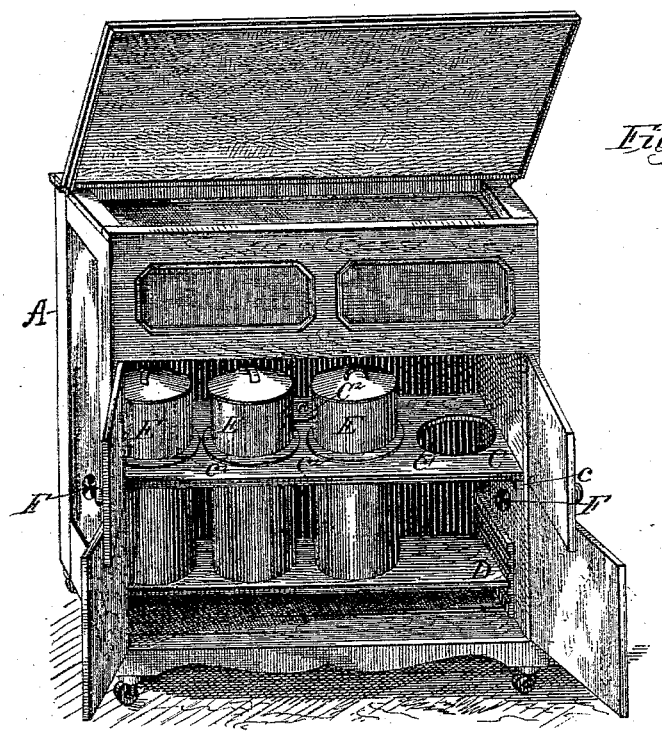
Figure 2:
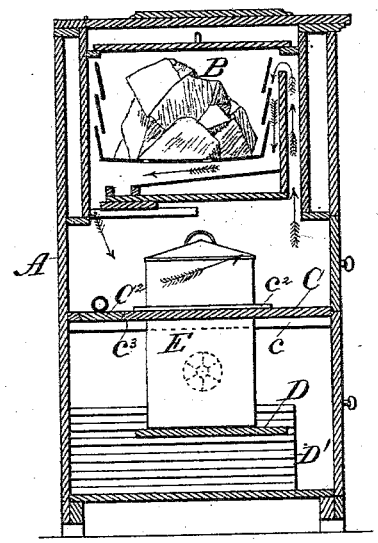
Figure 3:
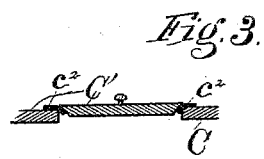

In the drawings, Figure 1 is a perspective view of a refrigerator provided with my attachment, and Fig. 2 is a transverse vertical section of the same. Fig. 3 is a detail.

The object of my invention is to provide an apparatus capable of affording different degrees of temperature—such as may be required for the successful raising of cream from milk, and at the same time preserving the milk pure and sweet and carrying off from it all animal heat and foul odors.

A is a refrigerator, provided with ice-chamber B in the top and suitable double walls and air-passages, as shown, the refrigerator selected for representation in the drawings being of the general pattern of the Bettridge "dry-air" refrigerators; but the particular style of refrigerator used is immaterial, so far as my present invention is concerned.

C is a shelf supported on strips or ledges $c$, and extending from side to side and front to rear, so as to entirely divide the cooling-room below the ice-box into two unequal portions, the greater space being below, and this shelf, which is made of any desired non-conducting material, is provided with apertures or openings $c'$, for the insertion of milk-cans of any shape or form preferred, it only being necessary that said openings and cans should correspond to each other; and for the purpose of insuring an air-tight joint these openings are provided around the edges with linings $c^2$, of rubber or any other elastic or pliable material, and have covers, slides, or dampers $C'$ for closing them tightly when less than the full number of cans are used. Another opening, $c^3$, is provided in this shelf, and this is fitted with a similar cover, slide, or damper, $C^2$, for a purpose to be hereinafter explained.

D is a lower shelf, extending from side to side, but of less width from front to rear, and serving as a support for the cans. This latter shelf may be adjusted to any desired height by means of the racks D', in which it slides, so as to cause a greater or less portion of the cans E to project above the shelf C into the cooler part of the space beneath the ice-box as may be found desirable.

When the milk has been put into the cans and the latter placed in the position shown, the doors are tightly closed, and the rising of the cream will be hastened by the warmer air below the shelf C and the colder air above said shelf. If there is too great a difference in temperature, this may be corrected by uncovering the aperture $c^3$, which will let enough cold air into the lower space from the upper space to bring about the desired result; and if it is desired to make the air in the lower space still warmer the wheel-dampers F F in the sides of the refrigerator may be opened, and thus allow the warm air from the room to circulate through the said lower space. The cans need not be tightly closed, and hence the animal heat and odors in the milk will be readily carried off by the currents of air above the shelf.

Having thus described my invention, what I claim as new, and desire to secure by Letters Patent, is—

1. A creamery attachment to refrigerators, consisting of an air-tight shelf perforated for the admission of the upper portion of milk-cans, and dividing the cooling-space beneath the ice-box into two portions, whereby the lower portions of the said cans will be subjected to a warmer temperature than their upper portions, substantially as set forth.

2. A creamery attachment to refrigerators, consisting of an air-tight shelf perforated for the admission of the upper portion of milk-cans, and dividing the cooling-space beneath the ice-box into two portions, and a lower shelf for supporting the bottoms of the said cans, adjustable in height, so as to vary the degree to which the said cans may be projected above the upper shelf, substantially as set forth.

3. In combination with a refrigerator having an ice-box at top and cooling-room beneath, the air-tight shelf C, perforated for the admission of milk-cans, and having an opening, $c^3$, with cover or damper to admit the colder air above the shelf to the space beneath, and wheel-dampers F F in the sides of the refrigerator to allow warm air from outside to circulate through the said lower space, substantially as set forth.

In testimony that I claim the foregoing I have hereunto set my hand, on this 24th day of March, 1883, in the presence of two witnesses.

JOHN MILLER.

Witnesses:
  H. G. UNDERWOOD,
  M. KAUMHEIMER.